United States Patent Office 3,429,201
Patented Feb. 25, 1969

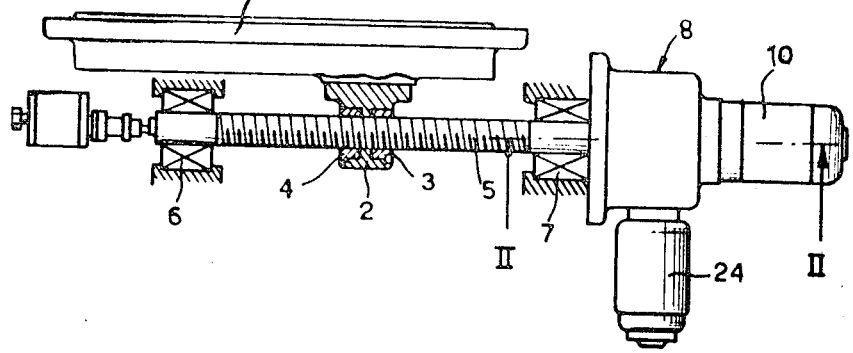
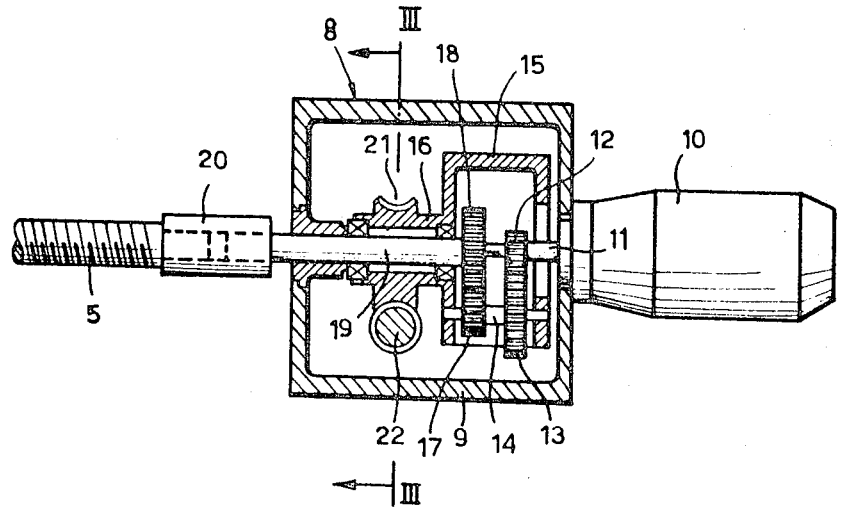

3,429,201
GEAR ADJUSTMENT FOR MACHINE TOOL TRANSMISSION
Mose Zucchellini, Turin, Italy, assignor to Fiat Società per Azioni, Turin, Italy
Filed Sept. 8, 1966, Ser. No. 577,886
Claims priority, application Italy, Sept. 17, 1965, 21,035/65
U.S. Cl. 74—675
Int. Cl. F16h *1/16*, *1/22*, *35/06*
4 Claims

ABSTRACT OF THE DISCLOSURE

A machine tool slide control having a constant speed motor with a geared connection to an output shaft through planet gears and a variable speed motor connected through a worm screw and worm gear to a planet carrier of the planet gears. The worm screw is rotatable in eccentric bushings which are adjustably secured to a gear box by means of screws passing through arcuate slots in the bushings.

---

The invention relates to a device for effecting translation at different speeds of movable slides, more particularly work-carrying slides of machine tools.

Such devices are generally arranged for transmitting to the slide a quick approach speed and a slower working speed and it is an object of the invention to provide an improved device of the above mentioned type which is adapted to transmit to the operated slide an infinitely variable slow speed for carrying out varied work programme.

It is a further object of the invention to provide a device of the above mentioned type by means of which, at slow speed, pendular movements can be effected for accurate positioning of the slide.

According to a further object, the invention consists in a device for effecting translational movement of a machine tool slide at variable speeds, the device comprising a constant speed motor the shaft thereof having keyed thereto a pinion connected by a gear train to an output shaft for control of the said slide, the shaft being coaxial with the motor, a variable speed motor being provided, the shaft thereof having keyed thereto a worm screw cooperating with a worm gear coaxial with and external of, the said output shaft, the said worm gear being fast with a frame carrying the said gear train to provide an epicyclic connection between the worm screw and the output shaft.

These and other object and advantages of the invention will be clear from the following description, given with reference to the accompanying drawings which are by way of example and in which:

FIGURE 1 is a diagrammatical part sectional view of a device according to the invention;

FIGURE 2 is an axial sectional view of the device of FIGURE 1 taken along line II—II;

In FIGURE 1 a slide 1 of a machine tool is longitudinally movable by a worm screw 5 cooperating with a nut arrangement. The slide 1 carries the nut arrangement on its bottom face, the said arrangement being in the form of an extension 2 which houses nuts 3 and 4 cooperable with the worm screw 5. The said nuts are conveniently of the recirculating ball type.

Figure 3:
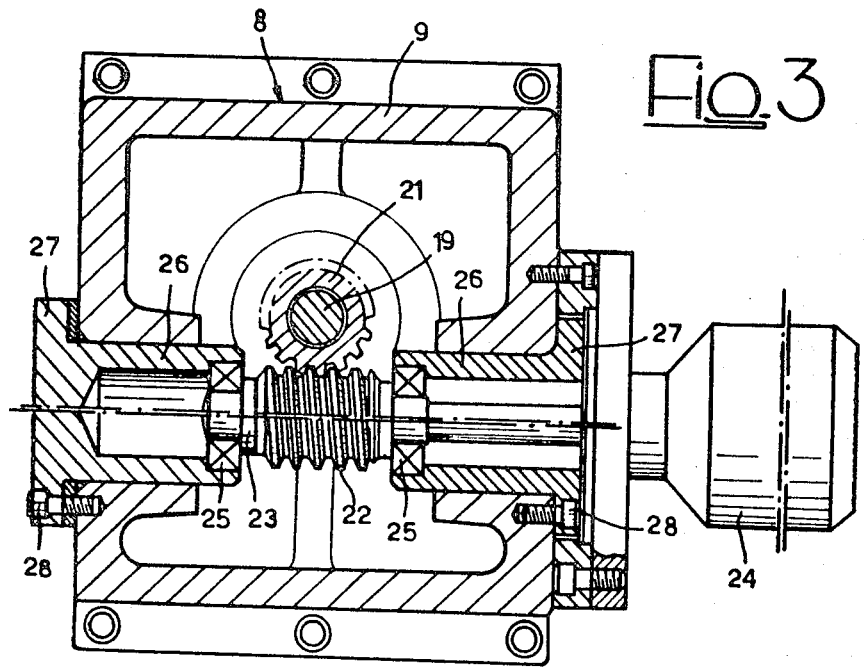
FIGURE 3 is a cross sectional view taken along line III—III of FIGURE 2.

The screw 5 is supported at its ends by a pair of supports 6, 7, respectively, near one of which supports (7) a control unit 8 is arranged, the said unit being provided with a constant speed self-braking motor 10 which transmits a high speed drive to the slide, a variable speed direct current servomotor 24 transmitting the low speed drive to the slide. As shown in FIGURES 2 and 3, the unit 8 comprises a box 9 enclosing a plurality of gears adapted to transmit the two different drives to the driving screw 5.

The self-braking motor 10 for the high speed drive is attached by flanges to the box 9 and has keyed to its shaft 11 a pinion 12 which cooperates with a further pinion 13 carried by a secondary shaft 14. The latter shaft 14 is supported by a frame 15 fast with a hollow sleeve 16 having keyed thereto a worm gear 21. An output shaft 19 is arranged coaxial with the sleeve 16 and worm gear 21 and is connected by a joint 20 to the previously mentioned screw 5 for the slide 1.

The output shaft 19 is arranged as an extension of the rotary axis of the motor 10 and carried, at its end nearest the pinion 12, a pinion 18 which meshes with a pinion 17 keyed to the shaft 14. The shaft 14 of course carries the pinion 13 which cooperates with the pinion 12 associated with the motor 10.

Figure 4:
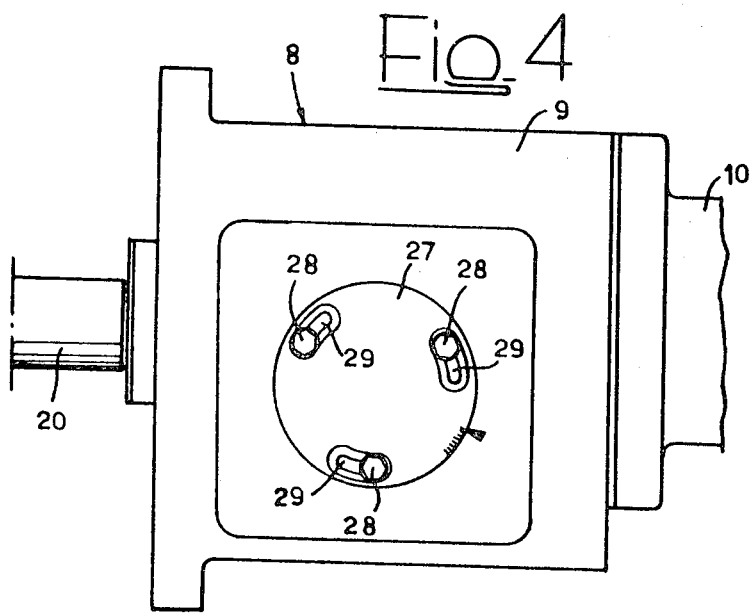
FIGURE 4 is an elevational view of a box enclosing the device.

The worm gear 21 meshes with a worm screw 22 which is fast with the shaft 23 of the variable speed direct current servomotor 24 which is attached by flanges to a side wall of the box 9. According to a preferred feature of the invention the shaft 23 carrying the worm screw 22 is supported on either side of the said screw by two roller bearings 25. These bearings are secured to the inside of two cylindrical bushes 26 provided with flanges 27 for attachment by means of screws 28 to opposite side walls of the box 9. The bushes 26 are rotatable about their axes which are aligned but are slightly eccentric with respect to the rotational axis of the shaft 23 and screw 22. Rotation is possible due to the fact that the attachment screws 28 are engaged in arcuate slots 28 (see FIG. 4) cut in the flanges 27 so that any play between the screw 22 and worm wheel 21 can be taken up.

In use the transmission device operates as follows:

When the servomotor 24 is stationary and the self-braking motor 10 is operated, the pinion 12 transmits motion to the pinion 13 which, being fast with the pinion 17, transmits motion to the pinion 18 which is fast with the output shaft 19. In this one case, since the worm gear 21 is stationary, the gears behave as a conventional stationary gearing and movement of the shaft 11 of the motor 10 is transmitted to the output shaft 19 via the conventional transmission pairs 12, 13 and 17, 18.

However, when the self-braking motor 10 is locked and the servomotor 24 is operated, the worm gear 21 rotates the frame 15 carrying the pinions 13, 17, which function as planet gears and which are rotated about the locked pinion 12 to transmit the planetary motion thereto and hence to the output shaft.

In the former case, that is to say when the self-braking motor 10 is operated and the servomotor 24 is stationary, a high approach speed is obtained, whereas in the latter case, that is to say when the self-braking motor 10 is stationary and the servomotor 24 is operating, the slow advance speed is obtained. The latter is of course variable in accordance with the possibility of varying the speed of the servomotor. Intermediate speeds may be obtained by operating both motors.

By use of the device described it is thus possible to provide various programming cycles which follow given deceleration and acceleration patterns on changeover from a quick approach to a slower working speed. For instance, following operation of the slide for quick approach, there may be a changeover to a slow stage with the possibility of pendular movement for accurate positioning of the workpiece.

As will be evident, the above described device is advantageously employed in operating tables or other parts of machine tools, more particularly of the digital control type, not only for controlling accurate automatic positioning and working feed, but also in milling operations. The device can be mounted in a horizontal or vertical position, and the servomotor can be arranged either to the left or to the right of the box in accordance with space requirements.

By mounting the worm screw on conical roller bearings a smooth transmission with a minimum of friction loss is provided, this being of course one of the essential conditions for accurate positioning of digital control tables.

Various modifications of the invention are of course possible within the scope of the appended claims.

What I claim is:

1. A device for effecting translational movement of a machine tool slide at variable speeds comprising:
   (a) a constant speed, self-braking motor;
   (b) a variable speed motor;
   (c) a pinion drivingly connected to the constant speed motor;
   (d) a gear train including planet wheels meshing with said pinion;
   (e) an output shaft drivingly connected to said gear train;
   (f) a worm screw drivingly connected to the variable speed motor;
   (g) a worm gear cooperating with the worm screw and coaxially surrounding said output shaft;
   (h) a rotatable frame carrying said planet wheels and fast with said worm gear;
   (i) a housing enclosing the gear train and the worm screw;
   (j) a pair of bushings rotatably supporting the ends of the worm screw for rotation about its axis; and
   (k) means mounting said bushings on said housing for rotation about an axis slightly eccentric from said axis of said worm screw, said means including arcuate slots concentric with said axis of rotation of said bushings and screws extending through said slots into said housing, whereby any play between the worm screw and the worm wheel can be taken up by rotating said bushings about their axis.

2. A device as defined in claim 1 wherein said pinion is keyed directly to a shaft of the constant speed motor.

3. A device as defined in claim 2 wherein the output shaft is coaxial with the shaft of the constant speed motor.

4. A device as defined in claim 1 wherein said worm screw is keyed directly to a shaft of said variable speed motor.

References Cited

UNITED STATES PATENTS

| | | | |
|---|---|---|---|
| 2,648,230 | 8/1953 | Stallsmith | 74—396 |
| 3,022,066 | 2/1962 | Benes | 74—396 X |
| 1,072,282 | 9/1913 | Waninger | 74—396 |
| 1,594,396 | 8/1926 | Weston | 74—675 |
| 2,203,298 | 6/1940 | Granberg | 74—675 X |
| 2,284,758 | 6/1942 | Morton et al. | 74—675 X |
| 2,785,579 | 3/1957 | Benjamin et al. | 74—396 |
| 3,146,636 | 9/1964 | Wollenhaupt et al. | 74—675 |
| 3,245,285 | 4/1966 | Kieboom | 74—675 |

DONLEY J. STOCKING, *Primary Examiner.*

T. C. PERRY, *Assistant Examiner.*

U.S. Cl. X.R.

74—396, 427